March 17, 1942.  J. R. MEADOR  2,276,855
ELECTRICAL INDUCTION APPARATUS
Filed Nov. 22, 1940  2 Sheets-Sheet 1
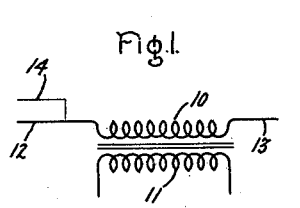
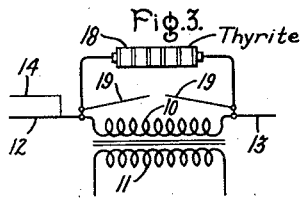
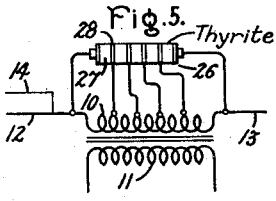
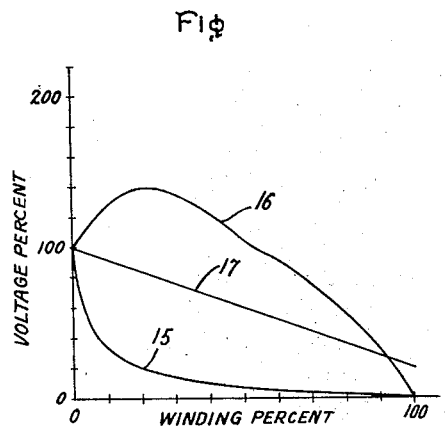
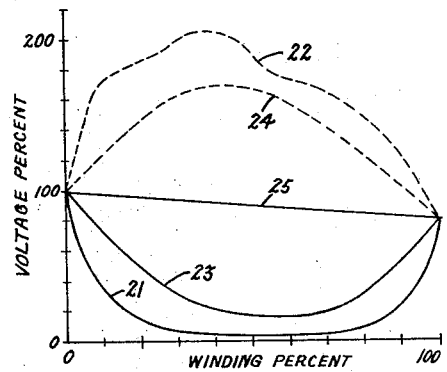
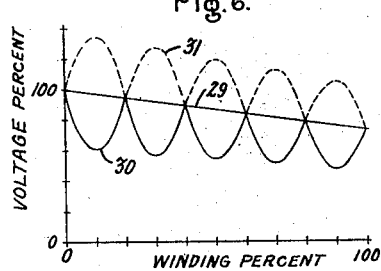
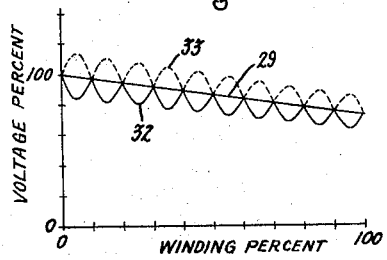
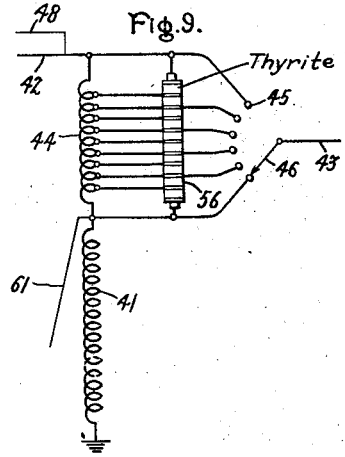
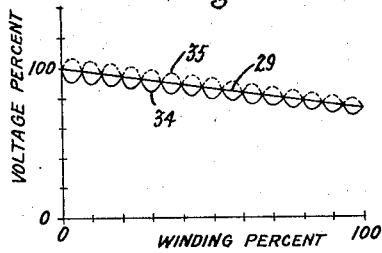
Inventor:
Jack R. Meador,
by Harry E. Dunham
His Attorney.

March 17, 1942.　　　J. R. MEADOR　　　2,276,855
ELECTRICAL INDUCTION APPARATUS
Filed Nov. 22, 1940　　　2 Sheets-Sheet 2
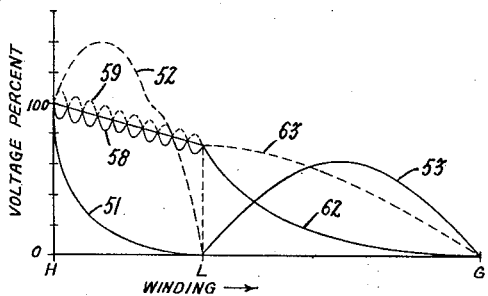
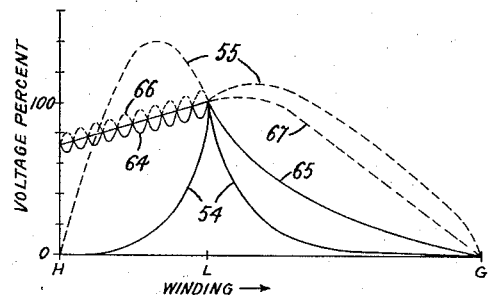
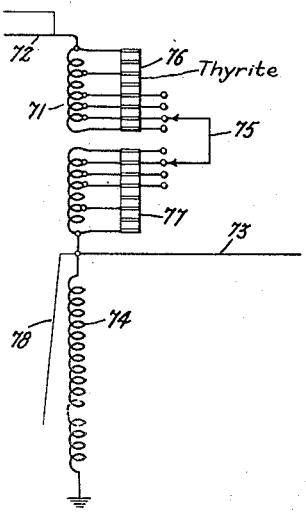
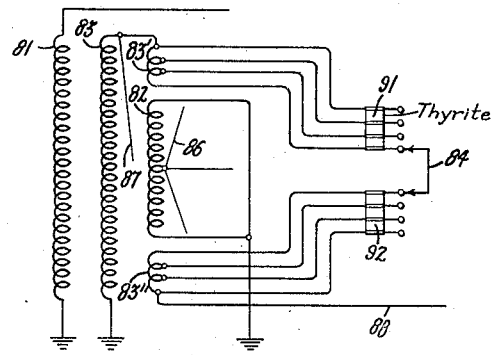
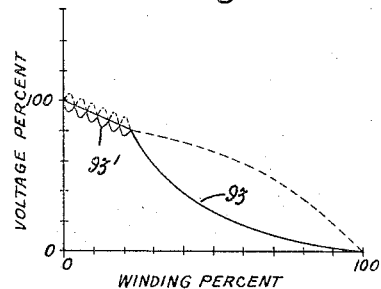
Inventor:
Jack R. Meador,
by Harry E. Dunham
His Attorney.

Patented Mar. 17, 1942

2,276,855

UNITED STATES PATENT OFFICE 2,276,855

ELECTRICAL INDUCTION APPARATUS

Jack R. Meador, Pittsfield, Mass., assignor to General Electric Company, a corporation of New York Application November 22, 1940, Serial No. 366,569

7 Claims. (Cl. 171—119)

The present invention relates to electrical induction apparatus and more particularly to means for protecting high voltage windings of such apparatus from breakdown under the impact of transient electrical waves. While the invention is not necessarily limited thereto, it is particularly adaptable to electrical induction apparatus having a winding or a portion thereof connected in a series circuit.

When a high voltage transient of high frequency or steep wave front, such as may be caused by direct or indirect lightning strokes, switching surges, and arcing ground oscillations, is impressed upon a winding terminal, one or more of the following three types of stresses may be set up within the winding. First, high voltage gradients may be produced across a turn or unit element of the winding, especially at the terminal end stressing particularly the turn and coil insulation; second, a high voltage potential to ground may be created at some point of the winding stressing particularly the major insulation thereof, that is, the insulation between the winding and the grounded portions of the apparatus; and third, cumulative oscillations may also be set up within the winding due to resonance, resulting in either high gradients or high potentials, or both. For the protection of windings against breakdown due to such transient phenomena, various forms of electrostatic shielding arrangements have been developed for so adjusting the capacitance network of the winding as to enforce a uniform voltage distribution throughout the winding under all conditions.

Certain types of windings, of which windings of series transformers and series winding sections of autotransformers are notable examples, do not lend themselves readily to the application of electrostatic shielding arrangements. Generally such windings or winding sections are tapped for varying the ratio of voltage transformation and while a favorable distribution of voltage may be obtained by an electrostatic shield arrangement for any one particular tap connection, such arrangements cannot practicably be made adjustable with changes in tap connections. If an electrostatic shield were applied to such a tapped winding section and the ratio adjuster switch were moved from the particular position, for which the shield was designed, to an opposite limit position, then a surge voltage would be distributed over the winding with gradients which in general would be much more severe by reason of the shield than if the shield had been omitted entirely. For these and other reasons it has been a common practice heretofore to connect a shunting device, such as a lightning arrester, across the terminals of such a series winding or winding section to provide a bypass for the transient wave. While such devices afford a certain measure of protection in that they limit the amount of the total voltage permitted to appear across the winding, the initial turn and coil stresses are in most cases unaffected thereby and these of course are a common, if not the most frequent, cause of winding failures.

Aside from the desirability of distributing the voltage across the winding for alleviating the winding insulation problems, an even more important reason is that by so doing, the stresses imposed upon the ratio adjuster switch are also greatly reduced. By eliminating excessive voltage gradients across the tapped portions of the winding, abnormally high voltages are automatically eliminated between winding taps and hence also between parts of the ratio adjuster switch connected thereto. With the arrangements herein described, it is possible to make regulators of a single core design which formerly were required to be of a two core design and thus costs are reduced substantially one half.

It is, therefore, a general object of the present invention to provide a new and improved arrangement for protecting a winding of electrical induction apparatus from breakdown under transient electrical waves.

It is a more specific object of the present invention to provide a new and improved protective arrangement for a series winding of electrical induction apparatus whereby the gradients in the initial distribution of a transient wave over the winding are reduced, and further, the oscillations occurring within the winding following the initial wave impact are limited to relatively small amplitudes.

It is a still further object of the invention to provide a new and improved protective arrangement for a winding of electrical induction apparatus having a plurality of taps for adjustment of the ratio of voltage transformation, the protective arrangement being so associated with the winding that the degree of protection given to the winding is substantially unaffected by changes of the tap connection.

The principle of the invention and the nature of the structure appropriate therefor, together with other objects and benefits of the invention, will be clearly understood from the following description taken in connection with the accompanying drawings, while the scope of the invention will be pointed out with greater particularity in the appended claims.

In the drawings, Fig. 1 is a diagrammatic sketch of an unshielded series transformer and Fig. 2 is a group of curves illustrating the distribution of a transient voltage across the high voltage winding thereof; Fig. 3 is a diagrammatic sketch of a series transformer provided with one well known protective arrangement and Fig. 4 is a group of curves illustrating the distribution of a transient voltage across the high voltage winding so equipped; Fig. 5 is a diagrammatic sketch illustrating a protective arrangement according to one form of the present invention applied to such a transformer and Figs. 6, 7 and 8 are curves illustrating the distribution of a transient voltage across a high voltage winding protected in this manner; Fig. 9 is a diagrammatic sketch of an autotransformer arrangement provided with a protective means according to a second form of the invention and Figs. 10 and 11 are groups of curves illustrating the distribution of transient voltages across the transformer windings so protected; Fig. 12 is a diagrammatic sketch illustrating how the protective arrangement of this invention may be applied to a second well known form of an autotransformer; Fig. 13 is a diagrammatic sketch of a multi-winding transformer having one tapped winding which is provided with a protective arrangement according to the invention and Fig. 14 is a curve illustrating the distribution of a voltage transient across the tapped winding so equipped.

For explanatory purposes, a series transformer is shown in Fig. 1, which may be a booster transformer having a secondary winding 10 connected in a series circuit between conductors 12 and 13 and a primary winding 11 which may be connected to a voltage regulator transformer (not shown). If a transient wave 14 having an abrupt front is impressed upon the winding from the conductor 12 then, due to the electrostatic and electromagnetic network of the winding, the resultant stress is initially distributed over the winding along a curve similar to 15 of Fig. 2 from which it will be noted that substantially the entire voltage is concentrated over a relatively limited number of turns adjacent the terminal, at high voltage gradients as indicated by the steepness of the slope of curve 15. Some time later, for instance a period corresponding to one-half cycle of the fundamental harmonic of the oscillations, the resultant potential distribution in the winding takes the form of curve 16 which, it will be seen, at some portions of the winding rises much higher than the terminal voltage. The steady state or condition of uniform distribution is indicated by the straight line curve 17, the slope of which is determined by the relative inductance of the winding and the voltage to which the conductor 13 is raised above ground as measured by its surge impedance. Should the transient wave be impressed upon the winding from the conductor 13, the stresses would be distributed over the winding in substantially the same manner except from the winding terminal to which the conductor 13 is connected. Since substantially the entire voltage appears across the winding 10, an impulse voltage will be induced in the primary winding which may cause not only a breakdown of this winding but also cause injury to other apparatus connected thereto.

In order to reduce the potential drop occurring across the winding 10 and hence the voltages induced in the primary winding, a suitable shunting means 18 has been connected across the winding terminals providing a by-pass for the transient wave as is illustrated in Fig. 3. A common means used for this purpose is a well known type of lightning arrester consisting of a plurality of disks of a material having a high inverse voltage resistance characteristic such as described in Patent 1,822,742 issued September 8, 1931, to Mr. K. B. McEachron, assigned to the General Electric Company, the assignee of the present application. Upon the impact of the voltage wave on the winding terminal through conductor 12, the resistance of the by-pass decreases greatly with little or no time lag whereby the voltage of the second conductor 13 is raised substantially instantaneously to the potential of the conductor 12 depending upon the voltage drop occurring across the by-pass resistance unit. The initial condition of stress distribution across the winding provided with such a by-pass may be illustrated by curve 21 of Fig. 4. While the resultant voltage appearing across the winding may be reduced to some relatively low value such as 20% of the applied wave to effectively prevent the transfer of excessive impulse voltages to winding 11, it will be evident from curve 21 that the coil and turn stresses on the winding 10 are substantially unaffected by the use of the shunting device. If the tail of the applied transient wave is of a sufficient length the midpoint of the winding may reach a voltage to ground, due to oscillations as indicated by the curve 22 of Fig. 4, which may be more than double that of the applied wave. The final or steady state of voltage distribution is indicated by curve 25.

By the application of electrostatic shields 19 to the winding and connected to the opposite terminals thereof the initial voltage distribution across the winding may be considerably modified as illustrated by the curve 23 of Fig. 4 in which the turn stresses are reduced to reasonable values well within the normal insulation level. The winding is still free to oscillate, however, and such oscillations may elevate the voltage from the midpoint of the winding to ground to excessive values considerably greater than that of the applied wave such as are indicated by curve 24. Moreover, as will subsequently appear, the protective scheme of Fig. 3 cannot be applied practicably to a tapped winding.

In accordance with the present invention, I provide a shunting arrangement for the series winding which is so connected thereacross that it not only reduces the total voltage drop occurring across the winding but also reduces the voltage gradients between turns and, further, limits the amplitude of the oscillations permitted to develop therein following the impact of a transient wave. As indicated in Fig. 5, the shunting unit or device 26 comprises a plurality of resistance disks 27 having a high inverse voltage-resistance characteristic, or being substantially nonconductive or slightly conductive for normal voltages and progressively increasingly conductive for higher voltages, such as having a substantially exponential resistance-ampere characteristic. An example of a material having such a characteristic is that of the disks of the device 18 of Fig. 3 and described in the above-mentioned patent. The opposite end terminals of the unit are connected to the opposite terminals of the winding 10 while uniformly spaced intermediate points of the unit are connected to corresponding uniformly spaced points of the winding 10 so that upon a higher or abnormal voltage being impressed or under increasing voltage conditions the voltage values of the spaced points are progressively raised or raised to progressively decreasing values. The connections to the intermediate points of the unit may be made by means of metal plates 28 arranged between the disks 27 and in conductive engagement with the adjacent disk surfaces.

It is to be understood that the resistance characteristics of the unit 26 are such that under normal rated voltage conditions it is substantially non-conductive, that is, the resistance across the unit is so high that the watt loss thereacross is negligibly low. Upon the application of a transient voltage wave to the winding terminal the resistance of the unit 26 will drop with appreciably no time lag effectively providing a low impedance shunt path across the winding so that the voltage drop across the winding will be limited to a relatively low value. This voltage drop is indicated by the straight line curve 29 of Fig. 6 the slope of which is determined by the surge impedance of the unit 26. In the arrangement illustrated in Fig. 5, four intermediate points of the winding 10 are connected to four corresponding intermediate points of the resistance unit 26 so that the voltage of these various points of the winding will be definitely fixed at the voltage of the corresponding points of the resistance unit. The initial distribution of a voltage transient across the winding turns is illustrated by the curve 30 from which it will be observed that the potential gradients as measured by the steepness of any portion of the curve 30 occurring across turns of the winding are very materially reduced as compared with curve 15 of Fig. 2. Since the voltages of the intermediate winding points are definitely fixed at values between the voltages of the opposite ends of the winding the maximum amplitude of the oscillations permitted to occur at any point within the winding are limited to a relatively small percentage above the crest value of the applied transient wave as indicated by the characteristic curve 31.

The turn gradients and the maximum voltage to ground from any portion of the winding may be fixed at substantially any desired value by connecting a greater number of intermediate winding points to corresponding intermediate points of the resistance unit. In Fig. 7 are illustrated the characteristic curves for an arrangement in which nine intermediate points of the series winding are connected to nine corresponding intermediate points of the resistance unit. The maximum slope of the stress distribution curve 32 is substantially one-half that of the corresponding curve of Fig. 6 while the envelope of oscillations indicated by curve 33 is reduced to less than half of the envelope of oscillations for the arrangement characterized by the curves of Fig. 6. In Fig. 8 are shown characteristic curves for a winding having fourteen intermediate points connected to the protective resistance unit and clearly illustrate how the potential gradients across the turns, as indicated by curve 34, may be reduced to a condition of substantially uniform distribution across the entire winding while oscillations due to resonance, indicated by curve 35 may be practically eliminated.

The invention is particularly valuable for protecting the series winding of an autotransformer arrangement. Autotransformers are frequently used for connecting together two circuits of differing voltages when it is not necessary that the two circuits be completely insulated from each other. Such a transformer, as illustrated in Fig. 9, comprises one winding section 41 which is common to the high voltage line 42 and the low voltage line 43, and a second winding section 44 which is in series with the lines 42 and 43. The series winding section 44 is provided with a plurality of tap connections brought out to fixed contacts 45 of a ratio adjuster switch 46 connected to line 43 whereby the voltage ratio of the common and series winding sections may be varied to control the flow of energy between the lines. Assume first that the full winding 44 is in the series circuit and that a transient wave 48 of an abrupt front is impressed upon the transformer from the line 42. With no protective means provided substantially the full transient voltage will appear across the series winding section 44 for the reason that the line connection 43 acts momentarily substantially as a solid ground effectively short circuiting the common winding section 41. The initial distribution of voltage across the series winding section 44 may be illustrated by curve 51 of Fig. 10 extending between the high and low voltage line connections H and L, respectively. The envelope of resonant oscillations occurring within the series winding section following the initial impact may be illustrated by curve 52. Since the entire voltage drop occurs across the series winding section, an impulse voltage will be induced in the common winding section 41 and which will produce oscillations therein which may be represented by curve 53 extending between the low voltage line connection L and ground G. In the event that the transient wave is impressed upon the transformer from the line 43 then line 42 will act momentarily substantially as a solid ground and the voltage stress will be distributed over the winding sections 41 and 44 as though they were connected in parallel. The adjacent portions of both winding sections 41 and 44 will be stressed by the initial distribution of voltage in a manner which may be illustrated by the curve 54 of Fig. 11 and independent oscillations will be set up within the two winding sections as may be illustrated by the curves 55. It is obvious that these curves of Figs. 10 and 11 will be characteristic for any tap connection of the ratio adjuster switch 46, the position of L relative to H and G of the curves, however, will be shifted accordingly. For a more complete discussion of transient voltage phenomena in the windings of autotransformers, those interested should refer to the paper by Mr. K. K. Palueff entitled "Effect of Transient Voltages on Power Transformer Design—Non-Resonating Auto-Transformer" printed in the Transactions of the American Institute of Electrical Engineers, vol. 50, June, 1931.

By applying the protective arrangement of the present invention to the autotransformer series winding, the severe stress conditions illustrated by the curves 51 to 55, inclusive, of Figs. 10 and 11 may be modified.

As shown in Fig. 9, the series winding section 44 is shunted by resistance unit 56, which is made up of elements similar to those used in unit 26 of Fig. 5. The unit 56 is connected between the terminals of the winding section 44 and to spaced intermediate points. In case of a series winding section having taps brought out to a ratio adjuster switch as shown, the matter of connection of the resistance unit across the winding is greatly simplified since the same tap leads may be connected to both devices. If four intermediate taps are brought out to corresponding contacts of the ratio adjuster switch and the intermediate resistance elements connected to such taps only then the surge voltage will be distributed across the series winding section in a manner as illustrated by the curves of Fig. 6. If desired, however, the number of connections between the resistance unit and the winding may be increased to nine by providing one additional winding tap between each of the switch tap connections and then connecting the various taps to corresponding intermediate points of the resistance unit. Such a connection arrangement is illustrated in Fig. 9 and which will result in a voltage distribution across the series winding section in a manner as illustrated by the characteristic curves 32 and 33 of Fig. 7 or by corresponding curves 38 and 39 of Fig. 10. It is obvious, of course, that any suitable number of connections may be provided between the series winding section and the resistance unit to provide the distribution of voltage desired.

It is to be understood that the resistance unit 56 will not act to reduce the potential gradients which may occur in the common winding section due to a voltage difference between line 43 and ground during a transient condition. To properly distribute the stress over this winding section a conventional electrostatic shield 61 may be provided and which is connected to the junction of the series and common winding sections. The characteristic curve 62 illustrates the distribution of stress over this winding section as effected by shield 61. Since there will be a relatively small voltage induced in the common winding section, the oscillations will be limited therein to some value well within the normal insulation level as indicated by the envelope curve 63.

With all of the winding section 44 connected in series between lines 42 and 43 and under an impact of a transient wave from line 43, the stress will be distributed over the series and common winding sections by the protective arrangement shown in Fig. 9 in a manner illustrated by curves 64 and 65, respectively, of Fig. 11 while oscillations due to resonance will be limited to relatively low values as indicated by curves 66 and 67.

With the voltage drop across the series winding section reduced to a fractional part of the applied voltage transient, and with this drop uniformly distributed between the tapped portions, a relatively slight voltage difference will occur between adjacent tap contacts of the ratio adjuster switch over the normal step voltages. Thus the ratio adjuster switch need not be designed for voltages greatly in excess of normal voltage and for this reason the regulating winding may be of a single core design instead of a two-core design as previously required in order to reduce the duty on the ratio adjuster switch mechanism to within reasonable limits.

In Fig. 9, the ratio adjuster switch is shown in the limit position in which all of winding section 44 is in series with the lines 42 and 43. If the switch 46 is moved into engagement with any of the other winding tap contacts, the extent of the series winding will be diminished and the voltage drop permitted to occur thereacross will be correspondingly reduced so that the stress distribution over the winding will be substantially the same as with the switch in the position shown. If the switch were adjusted to the opposite limit position in which all of the winding section 44 is removed from the series circuit and placed in the circuit with the section 41, then the transient voltage to ground across the entire winding would be distributed across the respective sections in accordance with the surge impedances of the unit 56 as regards that of winding section 41. Thus while the major portion of the voltage might be impressed upon the winding section 41 this section is adequately protected by the shield 61 to safeguard against excessive stresses appearing therein.

It will be readily apparent that the autotransformer arrangement illustrated in Fig. 9 may be either a single unit or divided into two separate units connected together in the manner shown. In the event that separate unit transformers are used in an autotransformer connection between lines of different voltages, the winding of the series transformer is usually tapped in the center in a manner as illustrated in Fig. 12. In this figure the series transformer 71 is shown connected between the high voltage line 72 and the low voltage line 73 while the common transformer 74 is connected between the low voltage line 73 and ground or neutral. The series transformer winding 71 is divided in the center and adjacent portions are tapped with the connections brought out to the fixed contacts of the ratio adjuster switch 75. Connected across the two parts of the winding 71 are resistance units 76 and 77, respectively, of the type previously described, the corresponding end portions of the units being connected between the leads brought out to the ratio adjuster switch, while the remaining portions are connected by separate leads extending to suitably spaced points of the corresponding winding portions. As previously described, the common transformer winding may be conveniently protected by means of a conventional electrostatic shield 78. The distribution of surge voltages across these transformers will follow substantially the same characteristics as are illustrated in the curves of Figs. 10 and 11.

The invention is not limited in its application to either series or autotransformers but is also applicable to other transformers and particularly so if such other transformers have a tapped winding section such as the special type of regulating transformer illustrated in Fig. 13. The transformer here shown is of a three-winding type having a low voltage winding 81, a high voltage winding 82, and an intermediate, relatively high voltage winding 83. Tapped portions 83' and 83'' of the winding 83 are arranged over the winding 83 and adjacent the opposite ends of the high voltage winding 82 in order that it will not be necessary to bring the tap leads out from underneath the winding 82 for connection to the fixed contacts of the ratio adjuster switch 84. While the high voltage winding 82 and the main portion of the winding 83 may be relatively easily provided with electrostatic shields 86 and 87, respectively, it will be obvious to those skilled in the art that it would be very difficult and impracticable to attempt to provide electrostatic shielding for the separated winding portions 83' and 83''. Obviously, since these winding portions are nearest the line 88 and hence subject to the greatest stress under impact of a transient wave arriving on line 88, means must be provided for their protection. In accordance with the further modification of this invention, resistance units 91 and 92 similar to those previously described are connected between the terminals of the winding sections 83' and 83" and with intermediate portions thereof connected to corresponding intermediate points of the respective winding sections. As indicated, these intermediate connections may be readily made to the tap connections brought out to the ratio adjuster switch. In Fig. 14 is shown a curve 93 which illustrates the initial distribution of voltage for the winding 83 for a transient voltage wave impressed upon the line 88. The upper portion 93' of this curve represents the distribution of voltage across the tapped winding portions 83', 83", as effected by the resistance units 91 and 92 and the remainder of the curve represents the voltage distribution over the main winding section 83 as modified by the electrostatic shield 87. The arrangement shown offers a simple solution to the problem of providing adequate protection to windings of an irregular design and which would be very difficult, if not impossible, to shield with conventional means.

Having described the principle of my invention in a number of typical embodiments, I desire to have it understood that the specific arrangements shown are merely illustrative and that I intend in the following claims to cover all such modifications as fall within the true spirit and scope of the invention.

What I claim as new and desire to secure by Letters Patent of the United States is:

1. In combination with an electrical winding having a line terminal, means for distributing over said winding a voltage suddenly impressed on said line terminal, said means being connected to said line terminal and to spaced points of said winding extending from said line terminal, said means being substantially nonconductive during normal operating voltage conditions of said winding and being progressively increasingly conductive for higher voltages being impressed upon said terminal whereby said spaced winding points extending from said terminal are raised to progressively decreasing voltages substantially instantaneously with the raise in voltage of said line terminal.

2. In combination, a winding of electrical induction apparatus, a high voltage terminal for said winding, means for distributing over said winding a voltage suddenly impressed upon said terminal, said means comprising a shunting device having a substantially exponential resistance-ampere characteristic connected across a first portion of said winding adjacent said terminal for limiting the voltage drop permitted to occur across said first winding portion and an electrostatic shield connected to the end of said first winding portion remote from said terminal for distributing the remainder of the voltage across a second portion of said winding.

3. A protective arrangement for a winding of electrical induction apparatus, said winding having a plurality of taps whereby the number of effective turns may be varied, said arrangement comprising a resistance unit connected to the opposite end taps of said winding, and connections between the intermediate winding taps and corresponding intermediate points of said resistance unit, said unit being slightly conductive during normal voltages and progressively increasingly conductive for higher voltage conditions so as to progressively raise the voltage of said taps and said winding points under increasing voltage conditions.

4. A transformer having a series winding, terminals for said winding, a portion of said winding having a plurality of taps whereby the ratio of voltage transformation may be varied, a resistance unit having opposite ends connected to said terminals, and conductive connections between said taps and corresponding intermediate points of said unit, said unit being substantially nonconductive during normal voltages and progressively increasingly conductive for higher voltage conditions so as to raise the voltage of said taps under increasing voltage conditions.

5. Electrical induction apparatus having a winding, said winding having a portion provided with a plurality of tap connections whereby the effective number of winding turns may be varied, means for distributing over said winding a voltage suddenly impressed upon a terminal thereof, said means comprising a resistance unit being slightly conductive during normal voltage and progressively increasingly conductive for higher voltage conditions, the opposite ends of said unit being connected to the opposite tap connections, the intermediate winding tap connections being connected to corresponding intermediate points of said unit, and electrostatic shielding means associated with the untapped winding portion.

6. In an autotransformer arrangement comprising a series winding section and a common winding section, said series winding section having a plurality of tap connections whereby the ratio of voltage transformation may be varied, a resistance unit with a substantially exponential resistance ampere characteristic having its opposite end terminals connected to the opposite ends of said series winding section and connections between said winding taps and corresponding intermediate points of said resistance unit.

7. In an autotransformer arrangement including a series winding section having a plurality of taps whereby the number of effective turns may be varied, protective means for said winding comprising a shunting unit connected to the opposite ends of said series winding section, and means connecting uniformly spaced intermediate points of said winding to corresponding intermediate spaced points of said unit, said unit having a substantially exponential resistance-ampere characteristic.

JACK R. MEADOR.